United States Patent [19]

Hedin

[11] Patent Number: 4,724,333
[45] Date of Patent: Feb. 9, 1988

[54] METHOD AND MEANS FOR DAMPING SUPERSYNCHRONOUS OSCILLATIONS IN AN AC POWER SYSTEM

[75] Inventor: Ronald A. Hedin, Dunwoody, Ga.

[73] Assignee: Electric Power Research Institute, Palo Alto, Calif.

[21] Appl. No.: 721,729

[22] Filed: Apr. 10, 1985

[51] Int. Cl.[4] ............................ H02M 1/12; H02J 3/01
[52] U.S. Cl. ................................ 307/105; 307/102; 322/58; 361/113
[58] Field of Search ............... 307/102, 105, 129, 104; 322/58, 75, 78; 323/210, 205, 208, 209; 324/78 F; 361/111, 113; 333/167, 170, 171, 172, 173, 176, 181

[56] References Cited

U.S. PATENT DOCUMENTS

| | | | |
|---|---|---|---|
| 3,555,291 | 1/1971 | Dewey | 333/176 X |
| 3,813,593 | 5/1974 | Tice et al. | 322/58 X |
| 4,139,723 | 2/1979 | Havas | 323/210 X |
| 4,331,882 | 5/1982 | Hingorani | 361/113 X |
| 4,355,241 | 10/1982 | Hingorani | 307/105 X |
| 4,434,376 | 2/1984 | Hingorani | 322/58 X |
| 4,551,780 | 11/1985 | Canay | 361/113 |

FOREIGN PATENT DOCUMENTS

| | | | |
|---|---|---|---|
| 1110691 | 6/1961 | Fed. Rep. of Germany | 333/176 |
| 58-29026 | 2/1983 | Japan | 323/210 |
| 58-96320 | 6/1983 | Japan | 323/210 |
| 1472411 | 5/1977 | United Kingdom | 323/209 |
| 0858524 | 11/1983 | U.S.S.R. | 323/210 |

OTHER PUBLICATIONS

Robert L. Boylestad "Introductory Ciruit Analysis", 3rd Ed., Charles F. Merril Publishing Co., Columbus, Ohio 1977, p. 561.

*Primary Examiner*—Bentsu RO
*Attorney, Agent, or Firm*—Flehr, Hohback, Test, Albritton & Herbert

[57] ABSTRACT

Damping of supersynchronous oscillations in an ac power system is accomplished by a damping circuit connected between a power line and a system neutral potential. The damping means includes a tuned circuit having a resonant frequency above the system operating frequency. Preferably, the tuned circuit further has an antiresonant frequency at the system frequency. The supersynchronous damping circuit in accordance with the invention can be used with subsynchronous damping circuits known in the prior art to enhance the damping of oscillations in the ac power system.

3 Claims, 7 Drawing Figures

METHOD AND MEANS FOR DAMPING SUPERSYNCHRONOUS OSCILLATIONS IN AN AC POWER SYSTEM

This invention relates generally to electric power systems, and more particularly the invention relates to a method and means for eliminating voltage and current supersynchronous oscillations in ac power systems.

Alternating current (AC) electric power systems are normally operated at 50 Hz or 60 Hz. Since a plurality of power sources can be connected to a power system, and further since independent power systems are normally interconnected with one another for back-up power sharing purposes, the maintenance of an exact frequency for the current and voltage in the power system is imperative. Voltage and current oscillations at other frequencies can create serious problems of stability of the system and safety of equipment in the system. These oscillations can be started by small or large disturbances and become a problem when system damping is low or even regenerative at certain frequencies.

For example, when generators are connected to a power system or when two power systems are connected by transmission lines, oscillations in the frequency range of 0.1 Hz to 5 Hz may be present. Such oscillations cause system instability.

Further, when large turbine-generator units are connected to a power system through long series-compensated transmission lines, oscillations in the range of 10-50 Hz often occur due to interaction of mechanical oscillations of a long turbine-generator shaft and the electrical system. Such oscillations can damage the generator shaft even when the amplitude thereof is small.

Alternatively, when a transmission line near a generating plant is disconnected to clear a fault, it is desirable to restore the line connection within a few cycles by high-speed reclosing of the breakers. This, in many applications, is not permitted because the oscillations of the machine started by the sudden change in load take a long time to decay, and mechanical oscillations caused by reclosure action could add to the earlier oscillations on the machines, and the resulting total torque and shaft twisting may exceed the acceptable limits. If, however, the oscillations could be made to damp more quickly, then faster reclosure of the disconnected line would be possible.

Disclosed in U.S. Pat. No. 4,434,376 is means for negatively damping subsynchronous oscillations and dc offset is an ac power system. The damping apparatus may be either series connected or shunt connected in the power system. The series connected apparatus includes reactance means serially connected in a power line and circuit means connected in parallel with reactance means including a resistor and serially connected switch means. Means is provided for triggering switch means when half cycle time periods of the voltage across reactance means in the power line exceed a desired half-cycle time period.

A shunt connected apparatus is disclosed also in which circuit means is provided for connecting a power line to a circuit neutral terminal or ground including a resistive means and a serially connected switch means. Again, means is provided for triggering the switch means in response to half cycle time periods of the voltage waves on the power line exceeding a desired half cycle time period.

Thus, the embodiments disclosed in the patent are concerned with damping subsynchronous oscillations and not specifically with supersynchronous oscillations or frequencies greater than the line operating frequency such as 60 Hz.

Accordingly, an object of the present invention is improved method and means for damping supersynchronous oscillations in a power system.

Briefly, a reactance network is provided in parallel with the electric generator. The reactance network is tuned to a supersynchronous frequency to provide positive damping. In a preferred embodiment, the reactance network is antiresonant at the system operating frequency and thereby tends to block current at the operating frequency while providing a low impedance path for supersynchronous currents. A plurality of reactance networks can be provided which are tuned to different supersynchronous frequencies.

Advantageously, the positive damping of the supersynchronous network in accordance with the invention can be combined with the subsynchronous network which provides negative damping as taught in U.S. Pat. No. 4,434,376.

The invention and objects and features thereof will be more readily apparent from the following detailed description and appended claims when taken with the drawings, in which:

Figure 1:
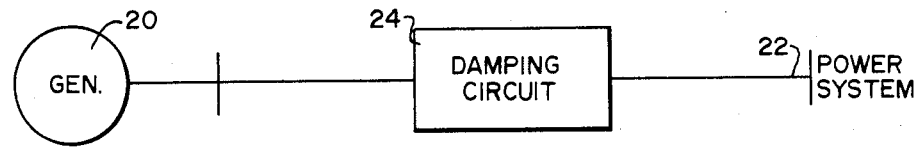
FIG. 1 and FIG. 2 are functional block diagrams of an electrical power system including damping apparatus in accordance with the prior art.
Figure 2:
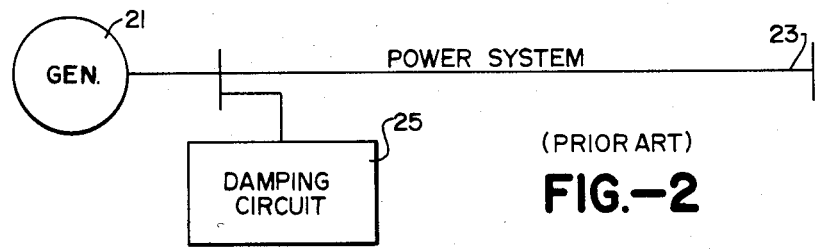

Referring now to the drawings, FIGS. 1 and 2 are functional block diagrams of electrical power systems including subsynchronous damping apparatus in accordance with the prior art. A generator 20 is connected to a power system transmission system 22 through a series connected damping circuit 24 in FIG. 1. The damping circuit may be near the point of connection of the generator or may be along the transmission lines. It is common practice to provide series capacitor compensation at several locations along the line routes, and the damping circuit may be provided at one or more of these capacitor compensations. It is assumed that the power system transmission line carries voltage at 60 Hz, and the generators generating a 60 Hz voltage with a spurious oscillation generating a subsynchronous frequency component, delta Hz.

FIG. 2 is a block diagram illustrating a generator 21 connected to a power transmission system 23 and a shunt connected damping circuit 25 for damping subsynchronous oscillations. The shunt damping circuit may be near the point of connection of the generator or may be along the transmission lines.

Figure 3:
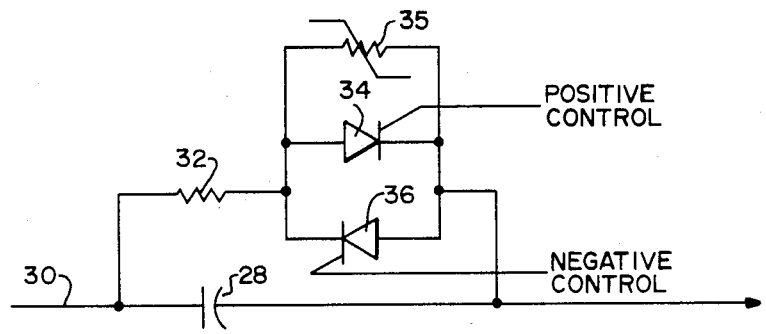
FIG. 3 and FIG. 4 are electrical schematics of two embodiments of subsynchronous damping apparatus in accordance with the prior art.

The damping networks for use in the power systems of FIGS. 1 and 2 are designed for negatively damping subsynchronous oscillations. In FIG. 3 capacitor 28 is serially connected with transmission line 30 as typically employed to compensate for line inductance. Discharging circuit means is connected in parallel with capacitor 28 for discharging the excess voltage wave periods and includes a resistor 32 serially connected with thyristors 34 and 36. The non-linear resistor 35 can be connected in parallel with thyristors 34, 36 as shown. The thyristors are connected in parallel and in opposite polarity whereby current flow through resistor 32 can be selectively controlled in either direction. When high voltage is involved the thyristor may be replaced by an assembly of thyristors which together act as a thyristor. Thyristor 34 is triggered conductive by a control signal when the excessive capacitor voltage half cycle period is positive, and thyristor 36 is triggered for a control signal when the excessive capacitor voltage half cycle is negative. In either case, after the larger half cycle is detected, the corresponding thyristor is fired to discharge the capacitor through resistor 32 for the excess portion of its half cycle voltage. This conduction causes capacitor 28 to discharge and accelerate the current zero of the capacitor voltage.

Figure 4:
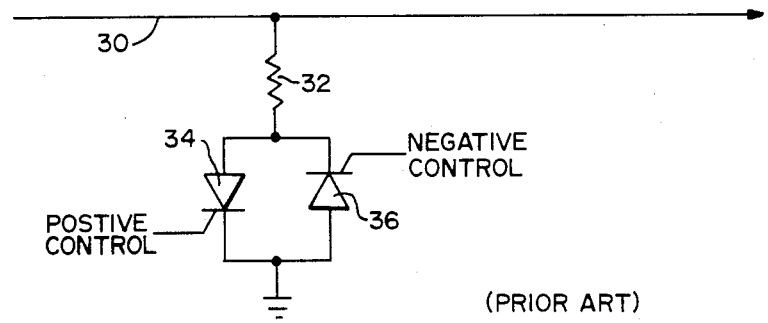

In FIG. 4 the subsynchronous damping network is shunt connected to the power system. In this embodiment the damping circuit including resistor 32 and thyristors 34 and 36 are connected between the transmission line 30 and a system neutral terminal such as ground. The damping circuits operate in the same manner as the damping circuit of FIG. 3; however, in this embodiment the voltage of the transmission line is monitored rather than the voltage across the series capacitor. When a half cycle of the line voltage is too large, the damping circuit is rendered conductive by applying the suitable trigger circuit to either thyristor 34 or thyristor 36, depending on the polarity of the line voltage, and the excess voltage is shunted to ground through resistor 32. Thus, the line voltage half cycles which are too long are forced towards zero level with consequent damping of the subsynchronous oscillation.

Figure 5:
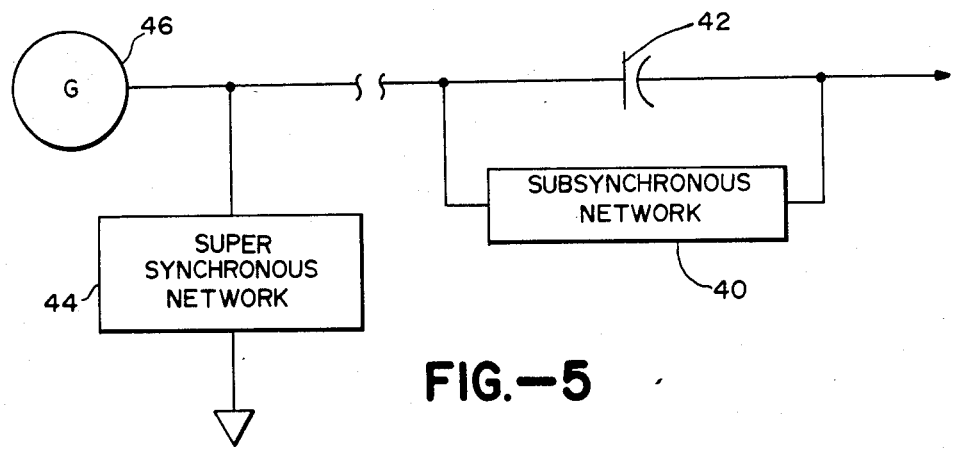
FIG. 5 is a functional block diagram of an electrical power system in accordance with the present invention.

Consider now FIG. 5 which is a functional block diagram of an electrical power system which includes a subsynchronous network as described above and a supersynchronous network in accordance with the present invention. The subsynchronous network 40 is connected in parallel with capacitor 42 which is serially connected in the transmission line. A supersynchronous network 44 shunts the generator 46 to ground. Accordingly, any subsynchronous oscillations or dc offset can be dampened by the subsynchronous network 40 whereas any supersynchronous frequencies are damped by the network 44.

Figure 6:
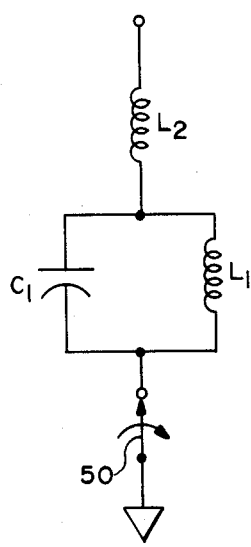
FIG. 6 and FIG. 7 are electrical schematics of two embodiments of supersynchronous damping networks in accordance with the invention.

FIG. 6 is an electrical schematic of a supersynchronous network in accordance with one embodiment of the invention. In this embodiment a first inductor L2 is serially connected with capacitor C1 and inductor L1 which are connected in parallel. The inductors and capacitors are connected to ground by a switch 50 which may comprise parallel thyristors as in FIGS. 1 and 2. In this embodiment the parallel components C1 and L1 are tuned to provide an antiresonant circuit at the operating frequency of the power system, such as 60 Hz. The serially connected components are tuned to a supersynchronous frequency, such as 80 Hz, for damping supersynchronous frequencies when switch 50 is closed.

Figure 7:
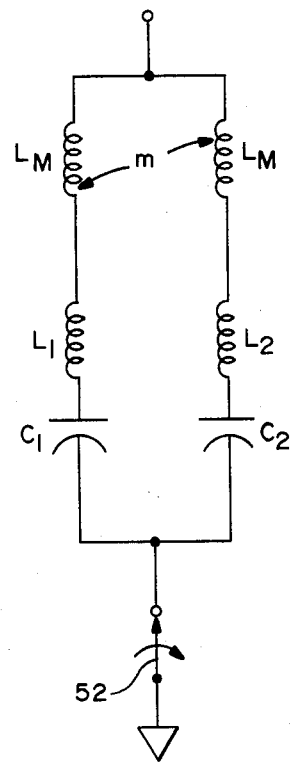

FIG. 7 is another embodiment of the supersynchronous damping network which includes two supersynchronous paths tuned to different frequencies above the system operating frequency. The inductors LM are mutually inductively coupled to reduce or eliminate circuit interactions, and the serially connected inductors and capacitors C1 and C2 are tuned to different supersynchronous frequencies, such as 80 Hz and 100 Hz. Again, a switch 52 is provided for connecting the supersynchronous damping network to circuit ground in response to the detection of superynchronous frequency waves in the power system.

The provision of positive damping to supersynchronous frequency waves in a power transmission system in accordance with the invention enhances the operation of electric power transmission systems when combined with the subsynchronous networks of the prior art. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. Apparatus for damping supersynchronous oscillations in an AC power line operating at a system frequency comprising a parallel tuned circuit and switch means for serial interconnection between said power line and a system neutral potential, said tuned circuit havint a resonant frequency above said system frequency and an antiresonant frequency at said system frequency, said tuned circuit including first inductive means serially connected with first capacitive means, second inductive means serially connected with second capacitive means, said first inductive means and said first capacitive means being connected in parallel with said second inductive means and said second capacitive means, said first inductive means and said second inductive means including mutually coupled inductors.

2. Apparatus as defined by claim 1 wherein said first inductive means and said first capacitive means are tuned to a first supersynchronous frequency, and said second inductive means and said second capacitive means being tuned to a second supersynchronous frequency.

3. Apparatus for damping oscillations in an AC power line operating at a system frequency comprising
a first damping circuit connected in series with said power line including capacitive means serially connected in said power line and switch means for selectively discharging said capacitive means,
a second damping circuit connected between said power line and a system neutral potential, said second damping circuit including switch means and a tuned circuit having a resonant frequency above said system frequency, said tuned circuit of said second damping means including first inductive means serially connected with first capacitive means, second inductive means serially connected with second capacitive means, said first inductive means and said first capacitive means connected in parallel with said second inductive means and said second capacitive means, said first inductive means and said second inductive means including mutually coupled inductors, said first inductive means and said first capacitive means being tuned to a first supersynchronous frequency, and said second inductance means and said second capacitive means being tuned to a second supersynchronous frequency, and
an antiresonant frequency at said system frequency.

* * * * *